US008762885B2

(12) United States Patent
Hwang et al.

(10) Patent No.: US 8,762,885 B2
(45) Date of Patent: Jun. 24, 2014

(54) THREE DIMENSIONAL ICON STACKS

(75) Inventors: Sok Y. Hwang, Dallas, TX (US); Heath Stallings, Colleyville, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 518 days.

(21) Appl. No.: 12/335,108

(22) Filed: Dec. 15, 2008

(65) Prior Publication Data

US 2010/0153844 A1      Jun. 17, 2010

(51) Int. Cl.
*G06F 3/048*     (2013.01)
*G06F 3/033*     (2013.01)
*G06F 3/14*      (2006.01)

(52) U.S. Cl.
USPC ........... 715/835; 715/836; 715/837; 715/838; 715/863; 715/864

(58) Field of Classification Search
CPC .. G06F 3/04817; G06F 3/0482; G06F 3/0488
USPC .................. 715/836, 837, 835, 838, 863, 864
See application file for complete search history.

(56) References Cited

U.S. PATENT DOCUMENTS

| | | | | |
|---|---|---|---|---|
| 5,317,687 A * | 5/1994 | Torres | ........................... | 715/823 |
| 5,835,094 A * | 11/1998 | Ermel et al. | ................... | 715/848 |
| 5,917,490 A * | 6/1999 | Kuzunuki et al. | ............. | 715/775 |
| 6,768,999 B2 * | 7/2004 | Prager et al. | ......................... | 1/1 |
| 7,543,245 B2 * | 6/2009 | Irimajiri | ......................... | 715/836 |
| 2002/0140746 A1 * | 10/2002 | Gargi | ........................... | 345/853 |
| 2004/0128277 A1 * | 7/2004 | Mander et al. | .................... | 707/1 |
| 2005/0066292 A1 * | 3/2005 | Harrington | .................... | 715/835 |
| 2005/0091596 A1 * | 4/2005 | Anthony et al. | ............... | 715/712 |
| 2005/0240880 A1 * | 10/2005 | Banks et al. | ..................... | 715/836 |
| 2006/0235908 A1 * | 10/2006 | Armangau et al. | ........... | 707/204 |
| 2007/0033537 A1 * | 2/2007 | Mander et al. | ................. | 715/764 |
| 2007/0070066 A1 * | 3/2007 | Bakhash | ........................ | 345/419 |
| 2007/0226652 A1 * | 9/2007 | Kikuchi et al. | ................ | 715/836 |
| 2008/0120571 A1 * | 5/2008 | Chang et al. | ................... | 715/810 |
| 2008/0307364 A1 * | 12/2008 | Chaudhri et al. | ............. | 715/836 |
| 2009/0307623 A1 * | 12/2009 | Agarawala et al. | ........... | 715/765 |
| 2010/0011304 A1 * | 1/2010 | van Os | ......................... | 715/762 |
| 2010/0083111 A1 * | 4/2010 | de los Reyes | ................. | 715/702 |
| 2010/0241955 A1 * | 9/2010 | Price et al. | ..................... | 715/702 |

FOREIGN PATENT DOCUMENTS

WO     WO 2007/121557 A1 * 11/2007 ................ G06F 3/14

* cited by examiner

*Primary Examiner* — Kieu Vu
*Assistant Examiner* — Aaron Lowenberger

(57)             ABSTRACT

A method performed by a user device includes displaying a graphical user interface (GUI) on a touch screen, where the GUI includes a stack having a plurality of items. Each of the plurality of items is at least partially exposed to permit selection by a user, and each of the plurality of items includes content or provides access to content. The method further includes detecting an area of the touch screen that is touched by an instrument, and determining whether the touched area corresponds to an area of the stack or an area of one of the plurality of items. The method also includes determining a gesture corresponding to the touched area, performing an operation, corresponding to the gesture, on the stack or on the one of the plurality of items, and displaying, on the touch screen, content associated with the operation.

18 Claims, 12 Drawing Sheets

THREE DIMENSIONAL ICON STACKS

BACKGROUND

With the development of touch screens, users may interact with a variety of user devices, such as, for example, mobile phones, personal digital assistants (PDAs), web browsing devices, navigation devices, media playing devices, and/or other types of touch-sensitive devices. For example, a user may perform various gestures on a touch screen to select or navigate through content displayed.

DETAILED DESCRIPTION OF PREFERRED EMBODIMENTS

Figure 1B:
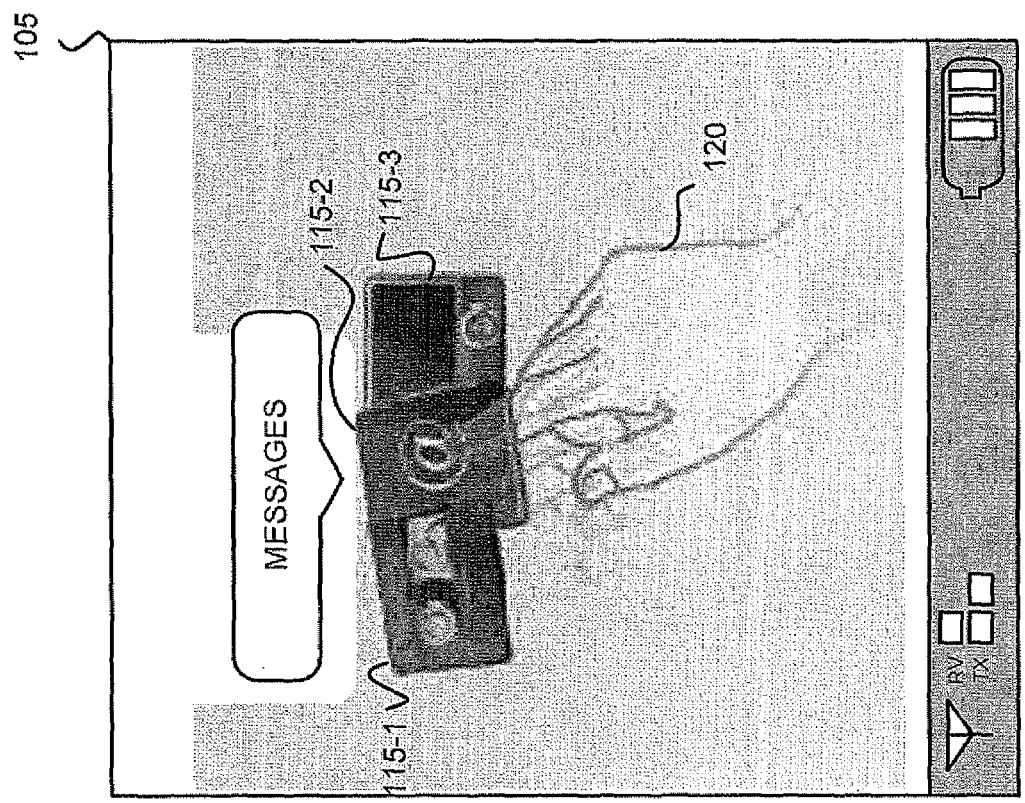
FIGS. 1A-1C are diagrams illustrating concepts described herein.

The following detailed description refers to the accompanying drawings. The same reference numbers in different drawings may identify the same or similar elements. Also, the following detailed description does not limit the invention.

The term "component," as used herein, is intended to be broadly interpreted to include hardware, or a combination of hardware and software.

The term "device," as used herein, is intended to be broadly interpreted to include an apparatus that includes one or more components.

The term "stack," as used herein, is intended to be broadly interpreted to include, for example, a pile (or number) of items that may be arranged in a particular order or index, or a pile of items that may be arranged without a particular order or index. Some or all of the items in a stack may be oriented in a manner that permits a user to select or access content associated with the item. In some instances, items within a stack may be of the same type or kind. For example, a stack may include multiple photos. In other instances, items within a stack may not be of the same type or kind. For example, a stack may include an icon associated with an address book, an icon associated with a music file, and an icon associated with weather information.

The term "item," as used herein, is intended to be broadly interpreted to include, for example, an object, an icon, or some other type of graphical interface. An item may include content and/or may provide access to content. For example, an item, such as a photo, may be considered content. In other instances, an item, such as an icon representing a music file, may not be considered content, but may provide access to content (e.g., songs, playlists, CDs, etc.).

The term "content," as used herein, is intended to be broadly interpreted to include, for example, data (e.g., multimedia, contacts, calendar, messages, weather, etc.), an application (e.g., e-mail, short messaging service (SMS), multimedia messaging service (MMS), a music player, a video player, etc.), etc. The content may be presented, for example, in a menu, a list, an icon, a window, etc.

The concepts described herein relate to providing content on a touch-based display that allows a user to select, access, and/or navigate through content with a minimum number of gestures. In one embodiment, by way of example, content may be structured in a stack. The stack may include multiple items that are layered one on top of another. For example, a music stack may include multiple items corresponding to albums, CDs, playlists, songs, etc. Some or all of the items may be partially exposed to allow a user to readily select, access, and/or manipulate a particular item within the stack.

The height or depth of the stack (e.g., the number of items in a stack) may be governed by a memory allocation associated with the content. In this regard, for example, a stack that includes items corresponding to received messages (e.g., telephone calls, e-mails, SMS messages, MMS messages, visual voicemail messages, etc.) may include a message that originally was received months ago or even longer. However, since the content may be presented in a stack, a user may select and/or access the message (received a substantial period of time ago) with a minimum number of gestures (e.g., one gesture or more). Further, in accordance with the concepts described herein, other features associated with a stack, an item, content stemming from the stack, the item, etc., will be described below.

Figure 1A:
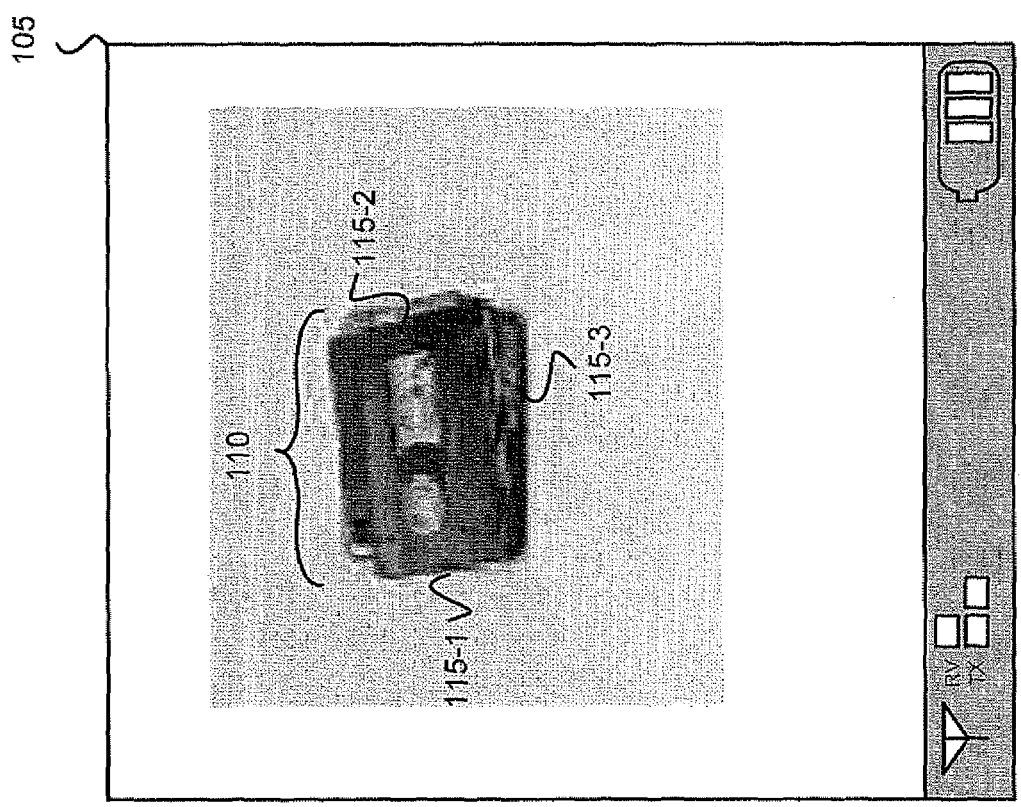
Figure 1C:
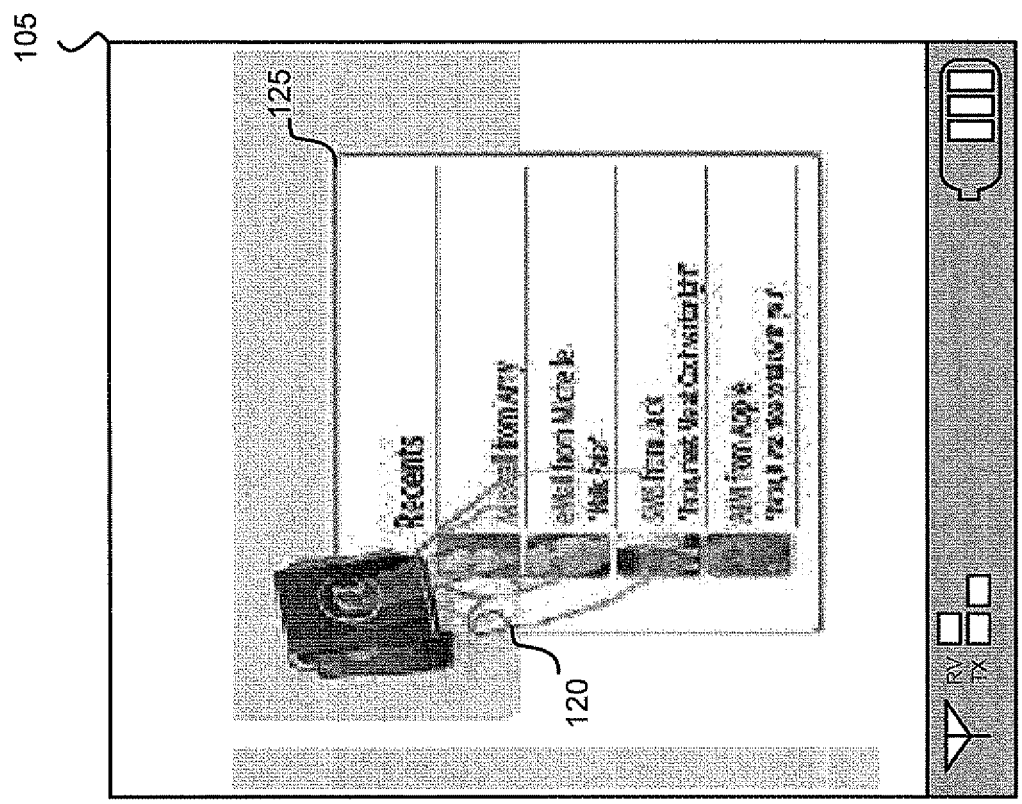

FIGS. 1A-1C are diagrams illustrating concepts described herein. As illustrated in FIG. 1A, a display 105 (e.g., a touch-screen display) may display content. By way of example, the content may include a stack 110. Stack 110 may include multiple items 115. For example, item 115-1 may represent music content, item 115-2 may represent message content, and item 115-3 may represent a multimedia player. For purposes of illustration, each item 115 is represented by an icon. However, it will be appreciated that in other implementations, item 115 may be represented by some other form of graphical information. Further, as illustrated in FIG. 1A, items 115 may be arranged in a manner to allow a user to select any item 115 from stack 110.

In FIG. 1B, assume that a user 120 wishes to view recently received messages. User 120 may select (e.g., with a finger) item 115-2 from stack 110. In one embodiment, stack 110 may expand (e.g., disperse items 115), in response to user 120's selection. In other embodiments, stack 110 may not expand. User 120 may manipulate item 115-2, such as, for example, drag item 115-2 anywhere on display 105. Additionally, although not illustrated, item 115-2 may enlarge and/or morph according to user 120's touch.

In FIG. 1C, assume that user 120 manipulated item 115-2 to the top of stack 110. In one embodiment, stack 110 may reconfigure itself, as shown in FIG. 1C, with items 115-1 and 115-3 in a new stack order. User 120 may perform a gesture (e.g., a single point gesture, a multipoint gesture, etc.) to view content associated with item 115-2. For example, a drop-down menu 125 may provide recent messages received. Although not illustrated, user 120 may access additional information by selecting from drop-down menu 125 and/or performing another or a different gesture with respect to item 115-2. For example, user 120 may access contact information associated with the person that sent a message to user 120 by selecting a photo of the person, as illustrated in drop-down menu 125. Additionally, or alternatively, user 120 may perform various gestures to obtain different types of information associated with item 115-2. For example, user 120 may access an address book by performing a gesture different than a gesture to access recent messages.

As a result of the foregoing, a stack of items corresponding to respective content may be arranged on a touch-based display. A user's experience may be significantly enhanced by minimizing the number of user interactions to access, select, and/or navigate through content. Additionally, or alternatively, the utilization of a stack may conserve space on a display without minimizing user access to content. Since concepts have been broadly described, variations to the above concepts will be discussed further below.

Figure 2:
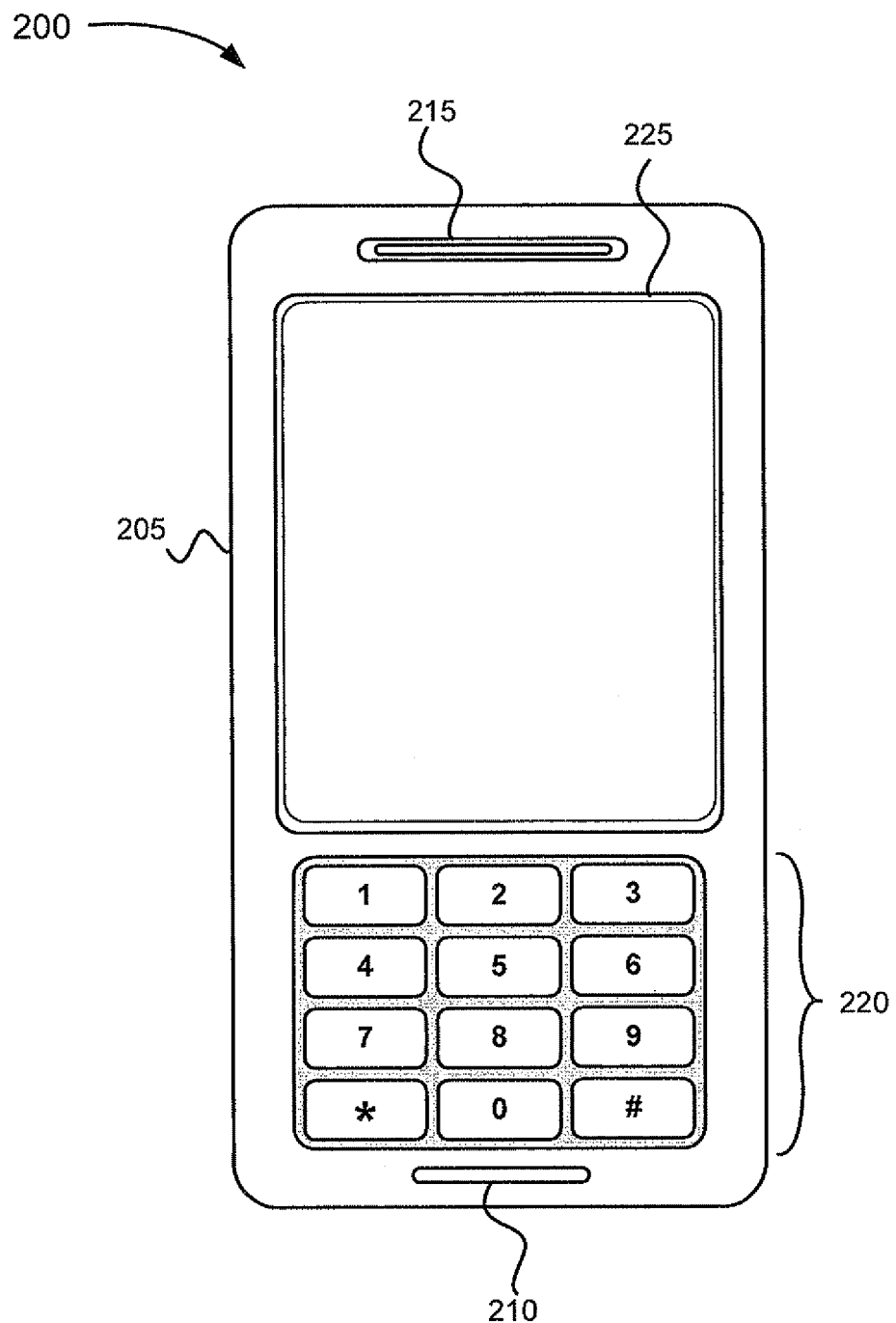
FIG. 2 is a diagram of an exemplary user device in which the concepts described herein may be implemented.

FIG. 2 is a diagram of an exemplary user device 200 in which the concepts described herein may be implemented. User device 200 may include a device with communication capability. In other embodiments, user device 200 may include a device without communication capability. By way of example, user device 200 may include a wireless telephone, a paging device, a computational device (e.g., a computer), a PDA, a web-browsing device, an Internet-based device, a personal communication systems (PCS) device, a kiosk device, a public information stand, a television, a financial-based device (e.g., automated teller machine (ATM)), a pervasive computing device, a gaming device, a music-playing device, a video-playing device, a global positioning system (GPS) device, a vehicle-based device, and/or some other type of portable, stationary, or handheld device. User device 205 may include a variety of applications, such as, for example, an e-mail application, a telephone application, a camera application, a multi-media application, a music player application, a visual voicemail application, a weather application, a contacts application, a data organizer application, a calendar application, an instant messaging application, a web browsing application, a blogging application and/or other types of applications (e.g., a word processing application, a spreadsheet application, etc.).

As illustrated in FIG. 2, an exemplary user device 200 may include a housing 205, a microphone 210, a speaker 215, a keypad 220, and a display 225. In other embodiments, user device 200 may include fewer, additional, and/or different components, or a different arrangement or configuration of components than those illustrated in FIG. 2 and described herein.

Housing 205 may include a structure to contain components of device 200. For example, housing 205 may be formed from plastic, metal, or some other material. Housing 205 may support microphone 210, speaker 215, keypad 220, and display 225.

Microphone 210 may transduce a sound wave to a corresponding electrical signal. For example, a user may speak into microphone 210 during a telephone call or to execute a voice command. Speaker 215 may transduce an electrical signal to a corresponding sound wave. For example, a user may listen to music or listen to a calling party through speaker 215.

Keypad 220 may provide input to device 200. Keypad 220 may include a standard telephone keypad, a QWERTY keypad, and/or some other type of keypad. Keypad 220 may also include one or more special purpose keys. In one implementation, each key of keypad 220 may be, for example, a push-button. A user may utilize keypad 220 for entering information, such as text or activating a special function.

Display 225 may output visual content and operate as an input component. By way of example, display 225 may include a liquid crystal display (LCD), a plasma display panel (PDP), a field emission display (FED), a thin film transistor (TFT) display, or some other type of display technology. Display 225 may display, for example, text, images, and/or video information to a user.

In one implementation, display 225 may include a touch-sensitive screen. Display 225 may correspond to a single-point input device (e.g., capable of sensing a single touch) or a multipoint input device (e.g., capable of sensing multiple touches that occur at the same time). Display 225 may implement, for example, a variety of sensing technologies, including but not limited to, capacitive sensing, surface acoustic wave sensing, resistive sensing, optical sensing, pressure sensing, infrared sensing, etc.

Figure 3:
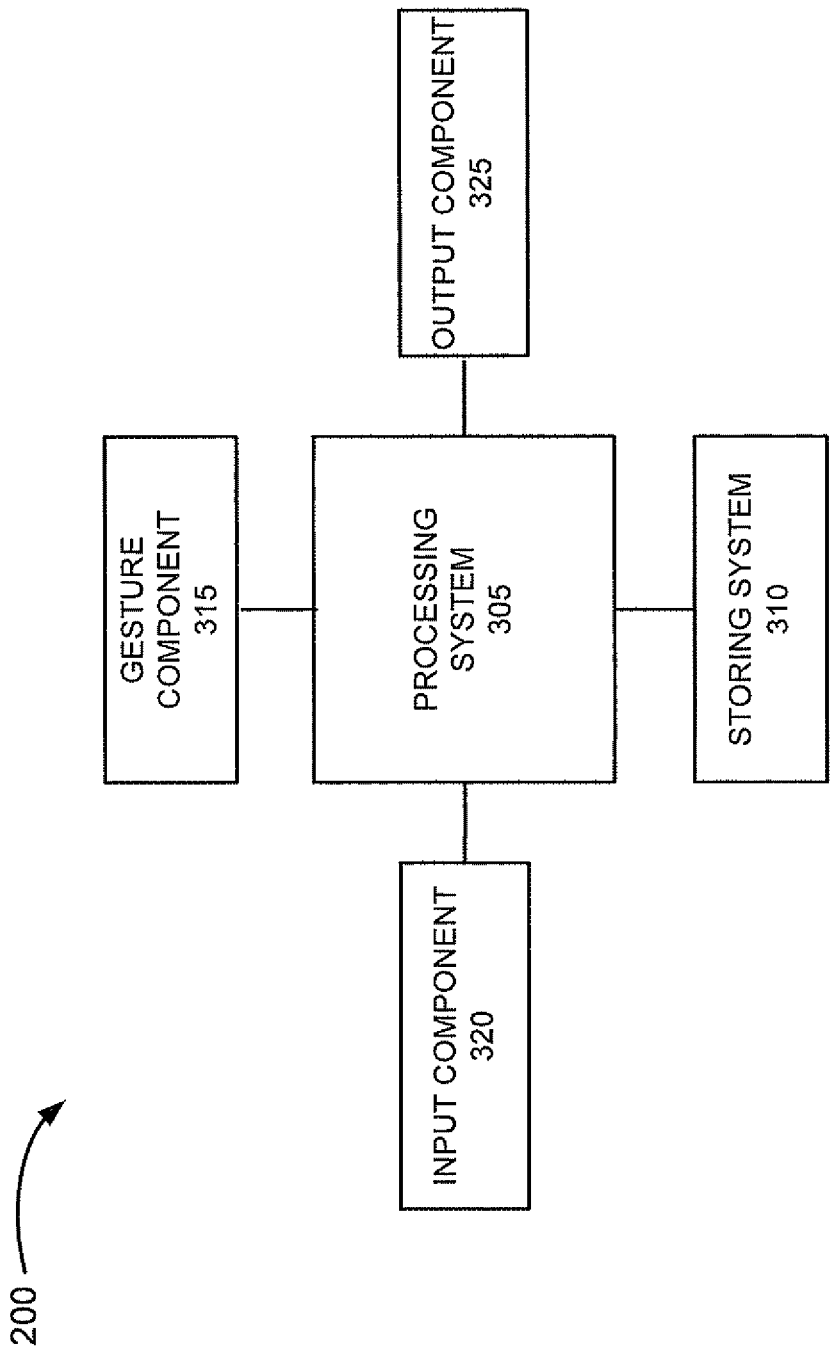
FIG. 3 is a diagram illustrating exemplary components of the user device.

FIG. 3 is a diagram illustrating exemplary components of user device 200. As illustrated, user device 200 may include a processing system 305, a storing system 310, a gesture component 315, an input component 320, and an output component 325.

Processing system 305 may interpret and/or execute instructions and/or data. For example, processing system 305 may include one or more general-purpose processors, microprocessors, data processors, co-processors, network processors, application specific integrated circuits (ASICs), controllers, programmable logic devices, chipsets, field programmable gate arrays (FPGAs), or some other component that may interpret and/or execute instructions and/or data. Processing system 305 may control the overall use of user device 200 based on an operating system and/or various applications.

Storing system 310 may store data, an application, and/or instructions related to the operation of user device 200. Storing system 310 may include memory and/or secondary storage (e.g., hard disk). For example, storing system 310 may include a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), a flash memory, and/or some other type of storage. Storing system 310 may include a hard disk (e.g., a magnetic disk, an optical disk, a magneto-optic disk, etc.), along with a corresponding drive. Storing system 310 may include any type of computer-readable medium. The term "computer-readable medium" is intended to be broadly interpreted to include a physical storage (e.g., a memory or a hard disk) or a logical storage. Logical storage may, for example, refer to a storing space within a single physical storage or disbursed across multiple storages.

Gesture component 315 may determine a gesture based on the area(s) touched on display 225. Gesture component 315 may determine an operation to perform based on the determined gesture. For example, gesture component 315 may interpret a user's gestures as commands for performing particular operations. By way of example, operations may include making a selection, entering input, paging, scrolling, zooming, rotating, dragging, expanding a view, collapsing a view, etc. Additionally, as described herein, gesture component 315 may interpret a user's gesture(s) to perform operations according to the concepts described herein. For example, gesture component 315 may interpret a user's gesture to permit access, selection, and/or navigation within a stack and corresponding content associated with a stack, an item of a stack, etc.

The instrument involved in providing a gesture may include a user's hand, finger(s), fingernail, or some other type of instrument (e.g., a stylus). As previously mentioned, a gesture may include a variety of actions, such as, for example, a single-point gesture or a multipoint gesture. Single-point gestures and multipoint gestures may each include, for example, continuous movement gestures (e.g., sliding across display 225), static gestures (e.g., tapping), multi-gestures (e.g., a sequence of strokes), etc.

Input component 320 may permit a user and/or another component to input information in user device 200. For example, input component 320 may include a keyboard, keypad 220, display 225, a touchpad, a mouse, a button, a switch, a microphone, an input port, voice recognition logic, and/or some other type of visual, auditory, etc., input component. Output component 325 may permit user device 200 to output information to a user and/or another component. For example, output component 325 may include display 225, speaker 215, one or more light emitting diodes (LEDs), an output port, a vibrator, and/or some other type of visual, auditory, tactile, etc., output component.

Although FIG. 3 illustrates exemplary components, in other implementations, user device 200 may include additional, fewer, or different components, or differently arranged components. For example, user device 200 may include a communication interface (e.g., a radio interface, a coaxial interface, an antenna, etc.) to enable user device 200 to communicate with other device(s) and/or network(s). Additionally, or alternatively, in other implementations, one or more operations described as being performed by a component, may be implemented by one or more other components, in addition to, or instead of, the component.

As previously described in relation to FIGS. 1A-1C, the concepts described herein may relate to providing content in a stack as a graphical user interface (GUI). A user may access content associated with items contained in the stack. For example, a user's gesture(s) may be interpreted (e.g., by gesture component 315) to provide a corresponding operation or function. The operation or function may include, for example, manipulating the stack (e.g., moving the stack, resizing the stack, etc.), manipulating an item in the stack (e.g., reordering items in the stack, dragging an item from the stack, etc.), accessing content associated with an item in the stack, navigating within content associated with an item, etc.

Figure 4A:
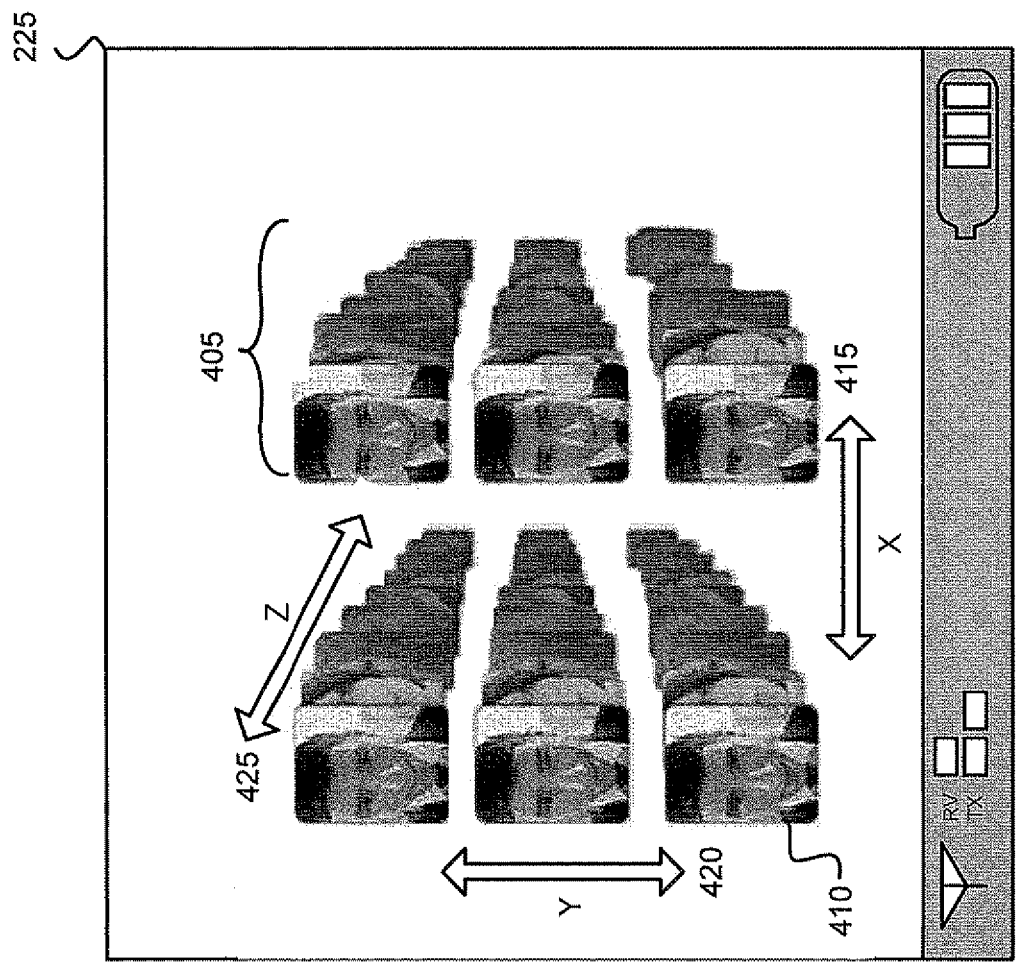
FIG. 4A is a diagram illustrating exemplary stacks.

FIG. 4A is a diagram illustrating exemplary stacks 405. As illustrated, each of the stacks 405 may include multiple items 410 that are staggered or arranged to allow access to respective content. For example, the content may correspond to or relate to contact lists, multimedia (e.g., music, videos, photos, etc.), messages (e.g., telephone calls, e-mails, SMS messages, MMS messages), etc.

Each of stacks 405 may include a three-dimensional aspect, where there exists an x-axis 415, a y-axis 420 and a z-axis 425. In one embodiment, z-axis 425 may correspond to the depth of stacks 405. In some implementations, the depth of stacks 405 may correspond to time (e.g., where items 410 correspond to messages, and the messages are arranged in time order in stack 405), an alphabetized ordering (e.g., where items 410 correspond to contacts, and the contacts are arranged alphabetically in stack 405), or some other type of indexing (e.g., frequency of access, a user-configured ordering or indexing, etc.). In other implementations, the depth of stacks 405 may not include a type of indexing or ordering. For example, a stack 405 having photos as items 410 may not be arranged with a particular indexing or ordering.

As previously mentioned, the height or depth of stack 405 may be governed by a memory allocation associated with the content. In one embodiment, a user may configure the number of items 410 in stack 405. In other embodiments, user device 200 may have default values associated with the number of items 410 in stack 405. In instances where the ordering or indexing of items 410 corresponds to time, for example, the number of items 410 in stack 405 may be quite large in number (e.g., hundreds or more). Although it may not be feasible to display stack 405 with a substantial number of items 410 (given the practicality of it), one solution may be to provide the user with multiple stacks 405 having different time granularities.

Figure 4C:
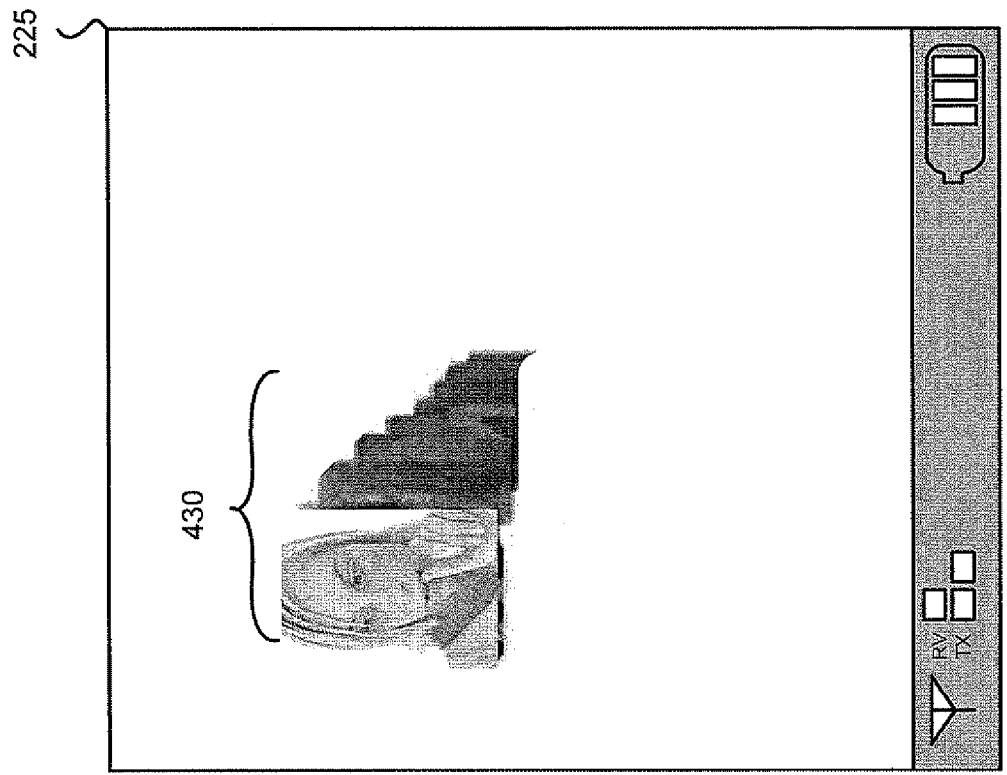
FIGS. 4B and 4C are diagrams illustrating exemplary stacks having different indexing granularities.
Figure 4B:
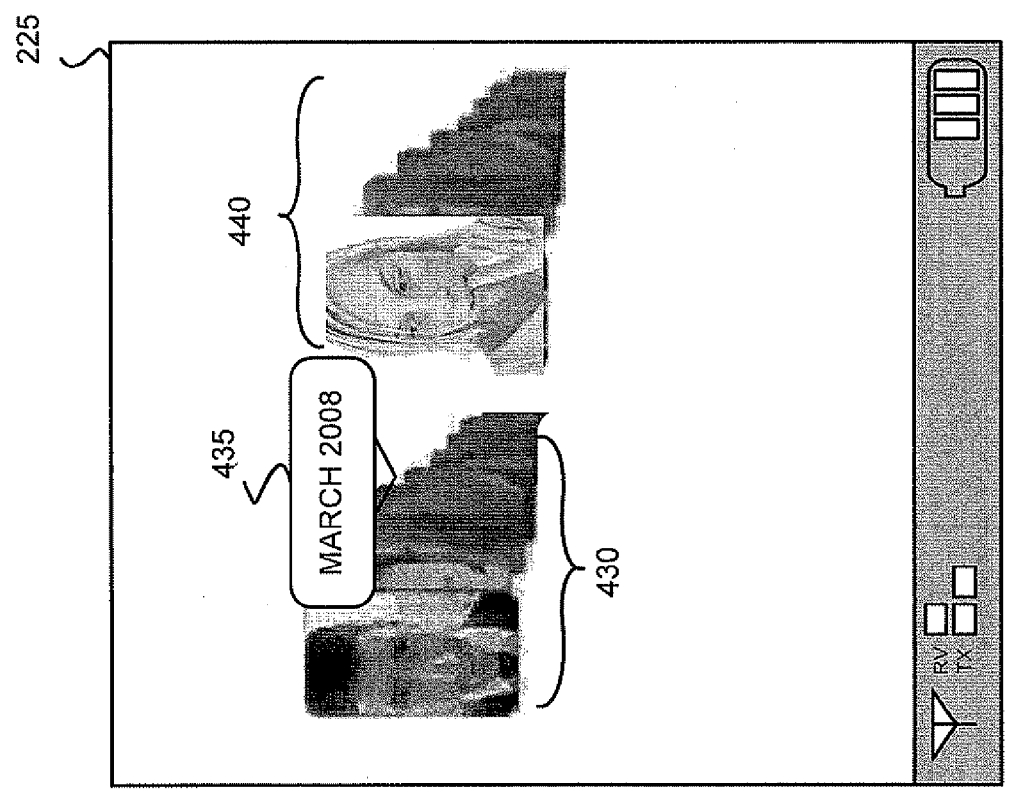

FIGS. 4B and 4C are diagrams illustrating exemplary stacks having different indexing granularities. In FIG. 4B, assume display 225 presents a stack 430. Items within stack 430 may have a time-based ordering or indexing. The user may gesture (e.g., touch) through each item of stack 430. As illustrated, indexing information 435 may appear to provide a guide to the user and to help the user select an item within stack 430 that corresponds to a time the user is interested. For example, indexing information 435 may provide month and year information. When the user selects an item from stack 430, another stack 440 may appear. The item selected from stack 430 may appear at the top of stack 440. Items within stack 440 may also have a time-based ordering or indexing. However, the granularity of the indexing information may be finer (e.g., by day). In this way, a user may readily access an item with minimal gestures. Further, a user may access a quite large number of items associated with a stack.

In an alternate embodiment, as illustrated in FIG. 4C, instead of another stack 440 appearing on display 225, stack 430 of FIG. 4B may become stack 440 of FIG. 4B. That is, the time-based granularity of items within stack 430 may change (e.g., become finer). In this embodiment, space on display 225 may be conserved. Although not illustrated, user device 200 may interpret various gestures to close a stack, navigate backward in selections (e.g., from stack 430 of FIG. 4C to stack 430 of FIG. 4B), etc.

Figure 5C:
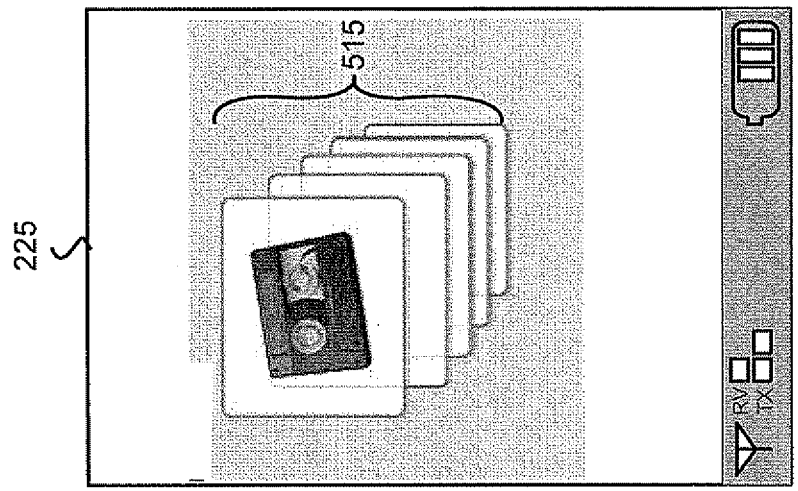
FIGS. 5A-5C are diagrams illustrating exemplary arrangements of items in a stack.
Figure 5B:
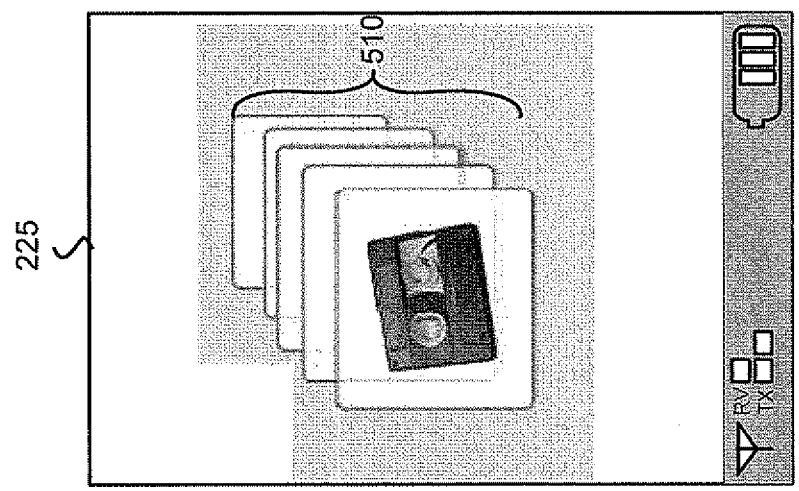
Figure 5A:
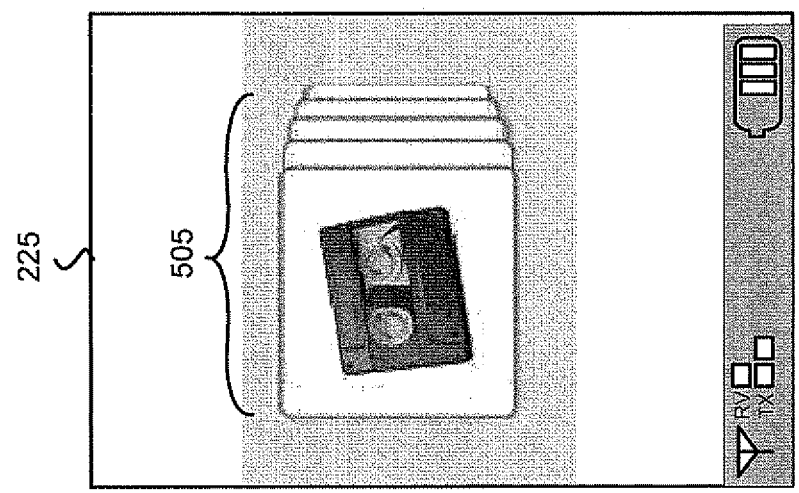

FIGS. 5A-5C are diagrams illustrating exemplary arrangements of items in a stack. For example, in FIG. 5A, stack 505 may correspond to a natural eye view. In FIG. 5B, stack 510 may correspond to a bird's eye view. In FIG. 5C, stack 525 may correspond to an ant's view. In other implementations the arrangement of items in a stack may be different than those illustrated in FIGS. 5A-5C. For example, stack 110 of FIG. 1A may correspond to a random view.

In one embodiment, a user may arrange items in a stack to permit a user-defined design. For example, a user may configure some items to protrude from the stack more than others. Additionally, or alternatively, a stack may be animated or automatically move (e.g., rotate, or items rearrange themselves in the stack) based on user configuration settings. In this way, a stack or the items within a stack may be tailored to a mood of the user, etc.

Figure 6:
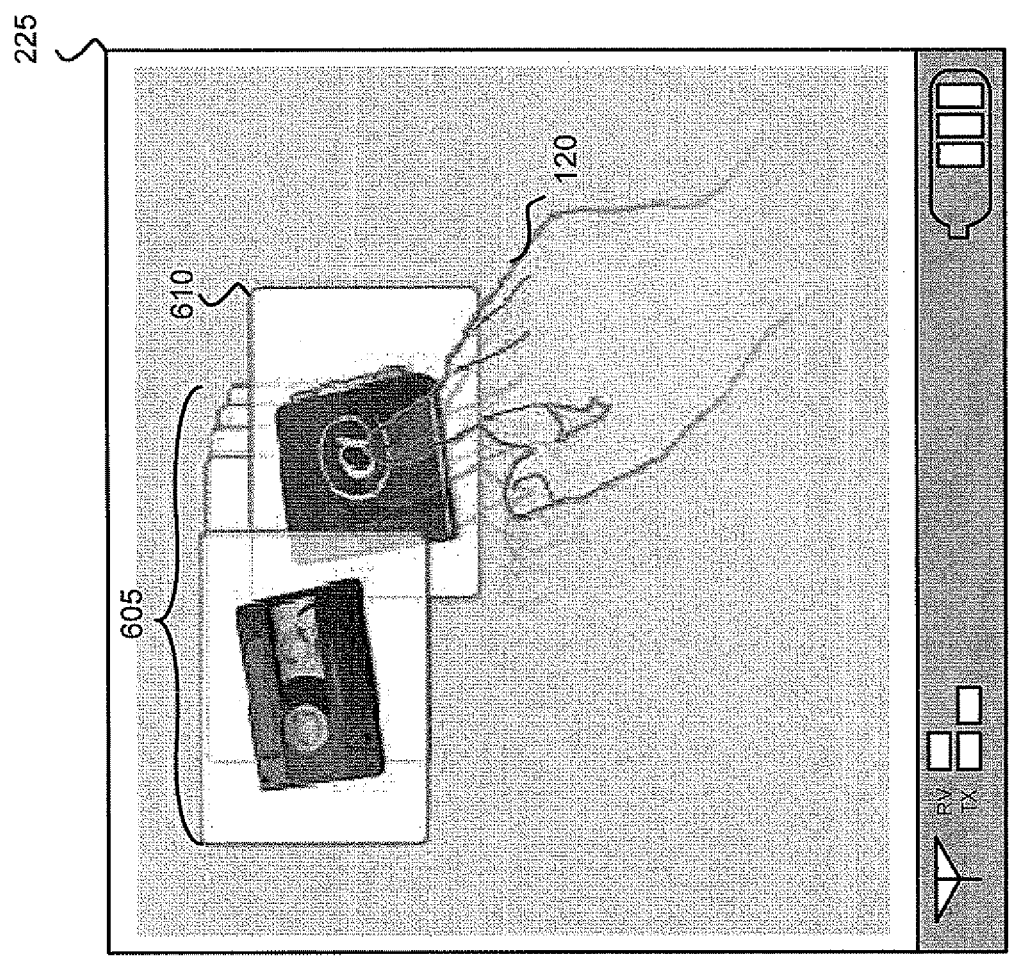
FIG. 6 is a diagram illustrating a selection or an access of an item within a stack.

As previously described, a user may select or access an item within a stack. For example, as previously illustrated in FIG. 1B, items within a stack may disperse when an item is selected or accessed. FIG. 6 is a diagram illustrating a selection or an access of an item within a stack. In contrast to the scheme shown in FIG. 1B, user 120 may select or access item 610 from stack 605 without disturbing the arrangement of the other items in stack 605. For example, user 120 may select and pull (or drag) item 610 from stack 605 to another area on display 225. User 120 may reinsert item 610 in stack 605 in the same place or elsewhere in stack 605.

Figure 7:
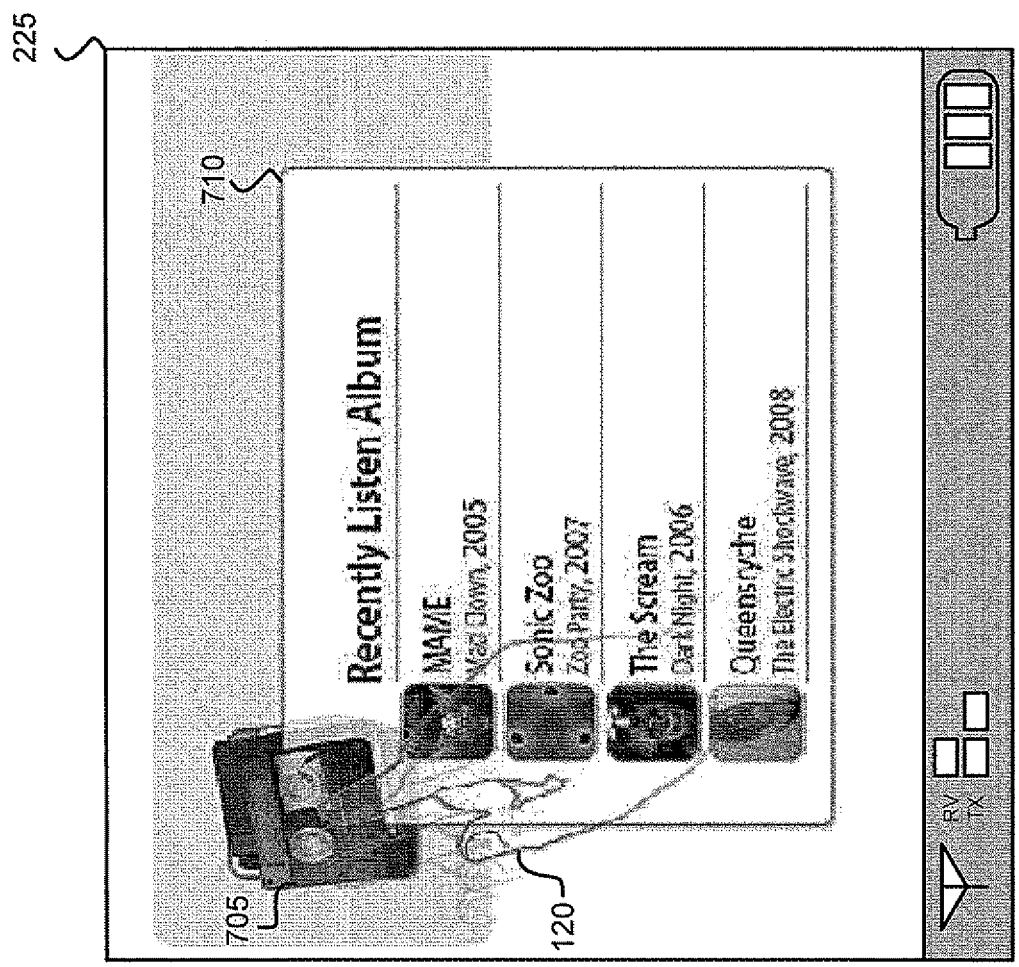
FIG. 7 is a diagram illustrating exemplary content associated with an item.

In one implementation, content may be associated with an item in a stack. FIG. 7 is a diagram illustrating exemplary content associated with an item 705. For example, item 705 may include an icon that represents musical content. User 120 may perform a gesture to access information associated with item 705. In response thereto, a menu 710 may appear that includes content, such as, for example, a list of albums recently listened to by user 120. Although not illustrated, user 120 may select a particular album from menu 710. User 120 may access further information (e.g., songs, album information, artist information, etc.) associated with the selected album and/or may begin playing the selected album. In this way, user 120 may navigate from item 705, to menu 710, to information within menu 710, and continue to further navigate deeper towards content.

Figure 8B:
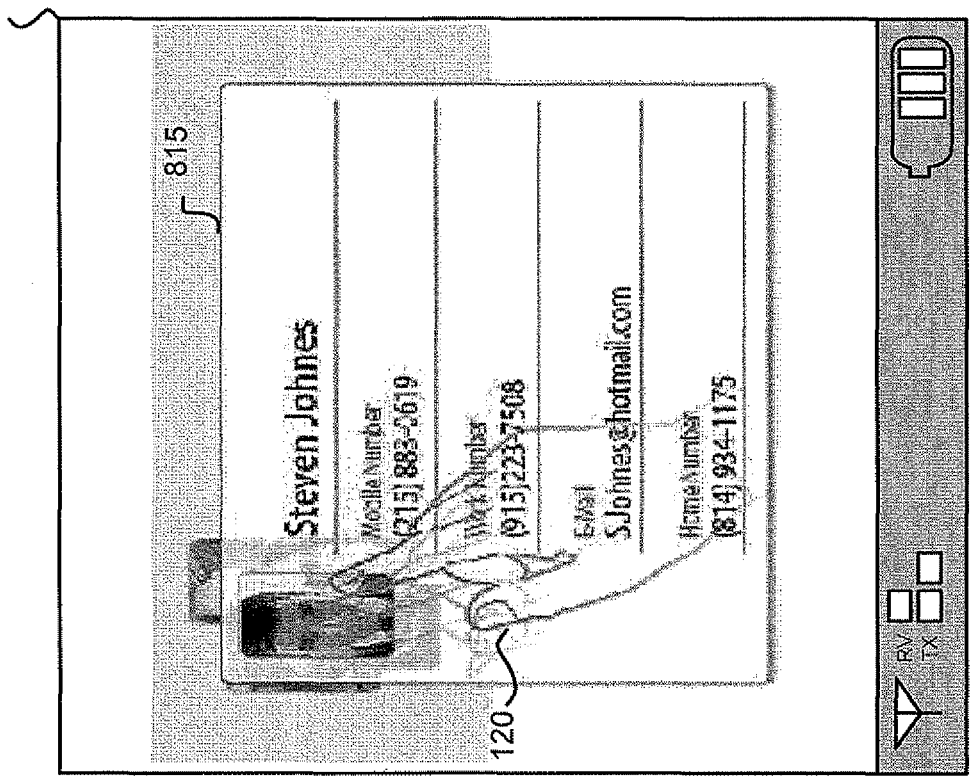
FIGS. 8A and 8B are diagrams illustrating an exemplary stack and content.
Figure 8A:
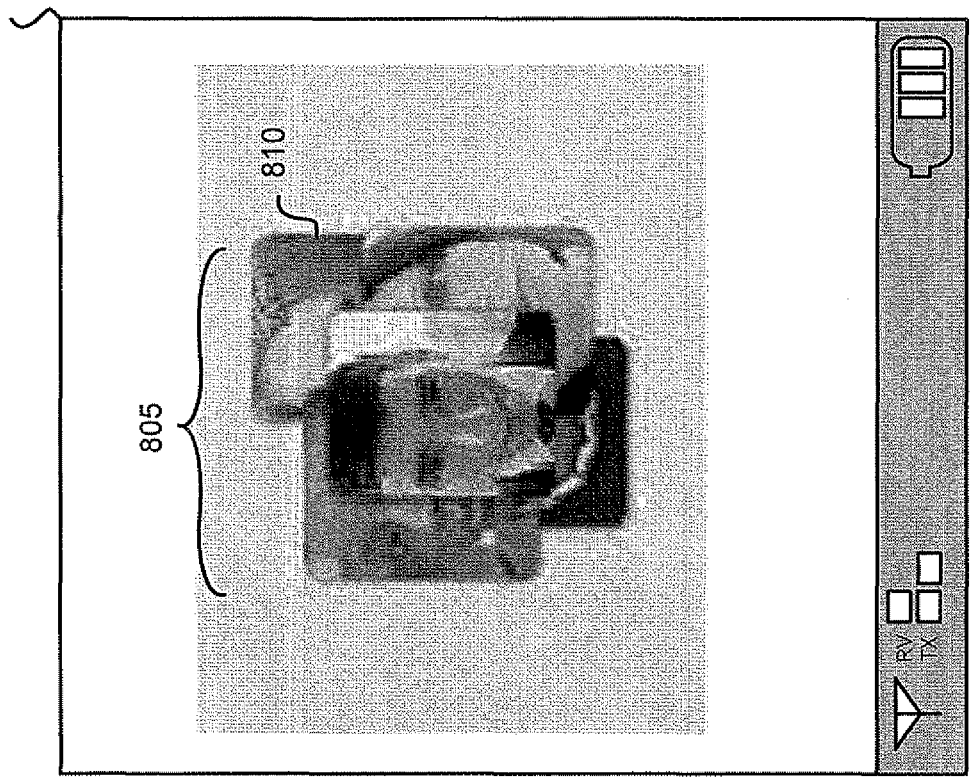
Figure 9:
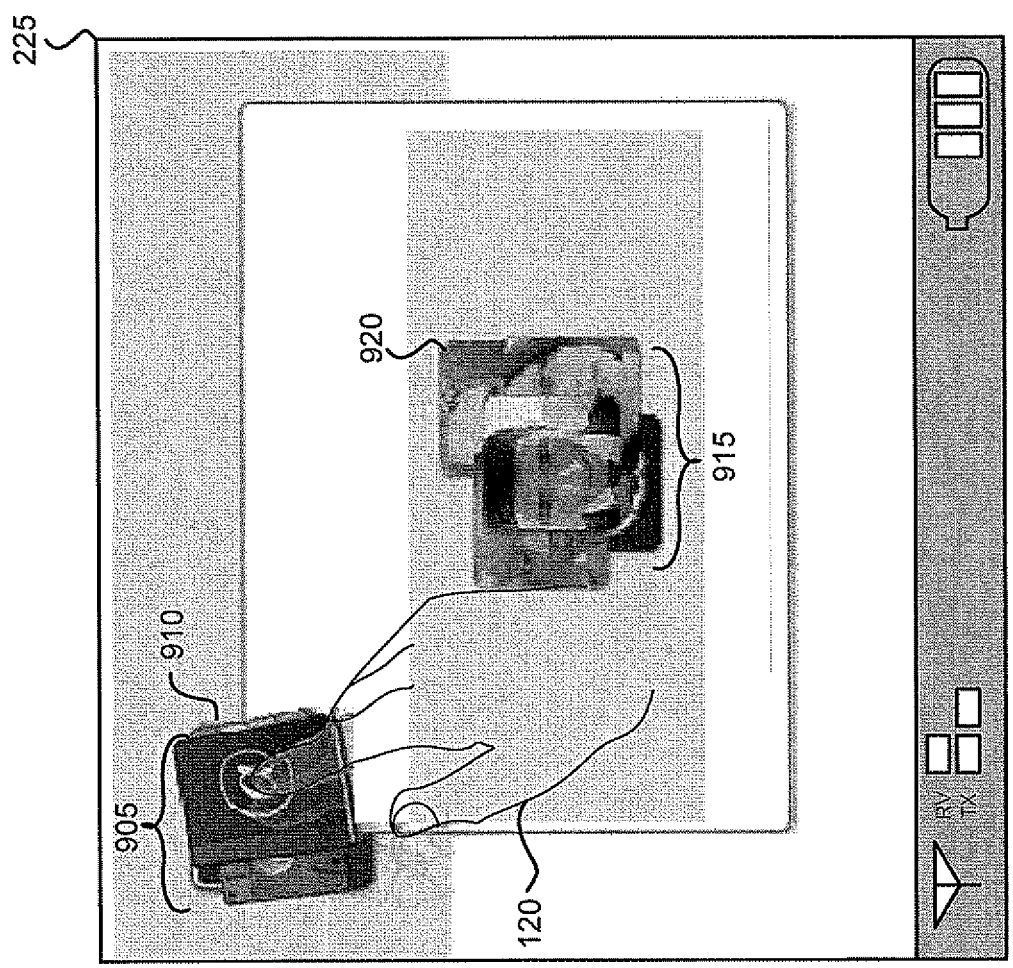
FIG. 9 is a diagram illustrating a user selecting an item from a stack.

FIGS. 8A and 8B are diagrams illustrating an exemplary stack and content. As illustrated in FIG. 8A, a stack 805 may include items 810. As previously described, an item within a stack may correspond to any type of graphical interface. For example, each of items 810 may include a photo. In FIG. 8B, user 120 may select one of items 810 to provide contact information associated with the selected item 810 (i.e., the person in the photo). By way of example, the contact information may be presented to user 120 in a window 815. A variation of FIGS. 8A and 8B is illustrated in FIG. 9. FIG. 9 is a diagram illustrating user 120 selecting an item 910 from a stack 905. For example, item 910 of stack 905 may correspond to an address book. In this implementation, user 120 may be presented with another stack 915. Each item 920 of stack 915 may correspond to a contact (represented by a photo). User 120 may select from any of items 920 from stack 915. In contrast to the concepts associated with FIGS. 4A and 4B (e.g., stacks within stacks), each of the stacks 905 and 915 in FIG. 9 may not necessarily share a common indexing or ordering.

Figure 10:
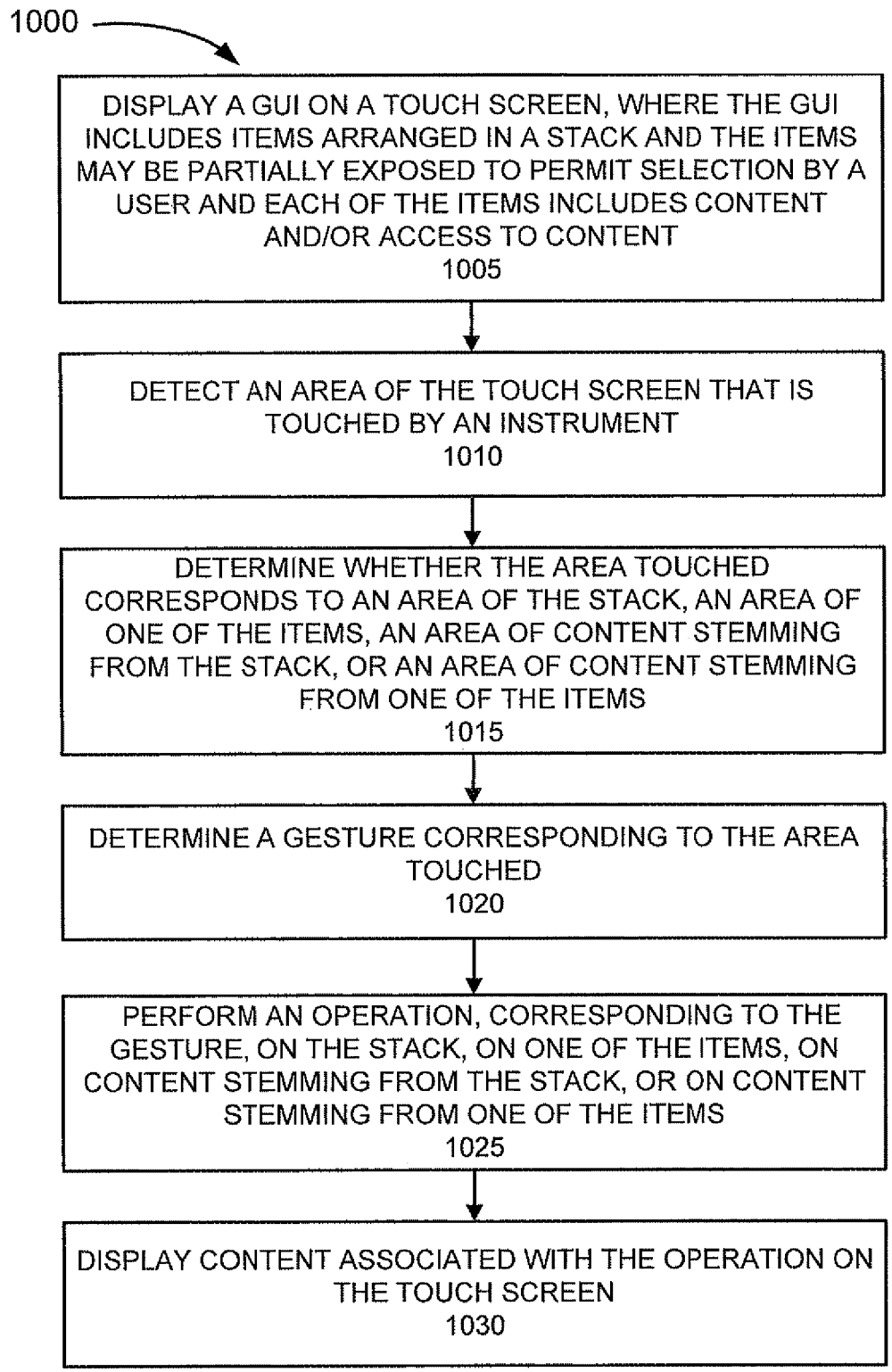
FIG. 10 is a flow diagram illustrating an exemplary process according to concepts described herein.

FIG. 10 illustrates a flow diagram illustrating an exemplary process 1000 according to concepts described herein. In one implementation, process 1000 may be performed by user device 200. User device 200 may include a touch screen (display 225) which provides a GUI. The GUI may include one or multiple stacks to provide content to a user.

Process 1000 may begin with displaying a GUI on a touch screen, where the GUI includes items arranged in a stack and the items may be partially exposed to permit selection by a user, and each of the items may include content and/or access to content (block 1005). Numerous examples of stacks have been described and illustrated. A stack may be displayed on display 225 as a GUI that provides access to, selection of, navigation of, etc., content. In some instances, an item may be considered content (e.g., a photo). In other instances, an item may not be considered content (e.g., an icon representing music) but may provide access to content (e.g., CDs, albums, songs, playlists, etc.).

An area of the touch screen that is touched by an instrument may be detected (block 1010). Display 225 of user device 200 may detect an area that is touched by an instrument. As previously mentioned, the instrument may include a user's hand, finger(s), fingernail(s), a stylus, etc.

A determination may be made whether the touched area corresponds to an area of the stack, an area of one of the items, an area of content stemming from the stack, or an area of content stemming from one of the items (block 1015). Display 225 and/or processing system 305 may determine whether a user's touch is located in proximity to the stack, an item of the stack, or an area of content stemming from the stack (e.g., a window, a menu, etc.) or an area of content (e.g., a window, a menu, etc.) stemming from the item of the stack.

A gesture corresponding to the touched area may be determined (block 1020). Gesture component 315 may determine a gesture based on the area(s) touched on display 225. A gesture may include a variety of actions, such as, for example, a single-point gesture or a multipoint gesture. Single-point gestures and multipoint gestures may each include, for example, continuous movement gestures (e.g., sliding across display 225), static gestures (e.g., tapping), multi-gestures (e.g., a sequence of strokes), etc.

An operation, corresponding to the gesture, may be performed on the stack, on one of the items, on content stemming from the stack, or on content stemming from one of the items (block 1025). As previously described and illustrated, a user may perform a variety of operations with respect to the stack, an item, or content stemming from the stack or the item. By way of example, the user may select, access, navigate, manipulate, drag, etc., the stack, the item, or content stemming from the stack, the item, or other content, etc. Other operations, not specifically illustrated and/or described, may also be performed, according to gesture based interaction with a touch screen.

Content associated with the operation may be displayed on the touch screen (block 1030). Display 225 may display content corresponding to the operation. As described and illustrated herein, the content displayed may correspond to any type of data, application, etc.

Although FIG. 10 illustrates an exemplary process 1000, in other implementations, fewer, additional, or different operations may be performed. For example, block 1030 may not be performed when the operation corresponding to the gesture includes closing a stack, an item, content, etc. In such circumstances, content associated with the operation may not be displayed on display 225.

According to the concepts described herein, a user device may provide a GUI on a touch-based display. The GUI may include one or multiple stacks having characteristics, as described herein. A user may interact with the stack, items in the stack, content stemming from the stack, content stemming from the items, etc., based on various gestures, to select, access, etc., content. Additionally, according to the concepts described herein, the presentation of one or multiple stacks on a touch-based display may conserve space on the display without hampering a user's ability to access content. Additionally, characteristics associated with the depth of a stack, as described and illustrated herein, may permit a user to access particular content within a volume of content, with a minimum number of gestures.

The foregoing description of implementations provides illustration, but is not intended to be exhaustive or to limit the implementations to the precise form disclosed. Accordingly, modifications to the concepts, implementations, etc., described herein may be possible. For example, although concepts have been described with respect to a user device including a touch screen or touch-based display, in other implementations, a touchpad or other input device may be utilized to receive the user input (e.g., gesture) to which content may be displayed on a display according to the concepts described herein.

The term "may" is used throughout this application and is intended to be interpreted, for example, as "having the potential to," "configured to," or "being able to", and not in a mandatory sense (e.g., as "must"). The terms "a," "an," and "the" are intended to be interpreted to include one or more items. Where only one item is intended, the term "one" or similar language is used. Further, the phrase "based on" is intended to be interpreted as "based, at least in part, on," unless explicitly stated otherwise. The term "and/or" is intended to be interpreted to include any and all combinations of one or more of the associated list items.

In addition, while a series of blocks has been described with regard to the process illustrated in FIG. 10, the order of the blocks may be modified in other implementations. Further, non-dependent blocks may be performed in parallel.

It will be apparent that the device(s) described herein may be implemented in many different forms of software or firmware in combination with hardware in the implementations illustrated in the figures. The actual software code (executable by hardware) or specialized control hardware used to implement these concepts does not limit the disclosure of the invention. Thus, the operation and behavior of a device(s) was described without reference to the specific software code—it being understood that software and control hardware can be designed to implement the concepts based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential to the implementations described herein unless explicitly described as such.

What is claimed is:

1. A method comprising:
    causing, by at least one processor, a user device to display, on a display device, a graphical user interface (GUI), the GUI including a stack with a plurality of items,
        the plurality of items being ordered in the stack based on at least one of:
            an alphabetical ordering, or
            a user-specified ordering,
        each of the plurality of items being at least partially exposed to permit selection by a user,
        the plurality of items being associated with a plurality of different content types, and
        each of the plurality of items graphically indicating an associated one of the plurality of the different content types;
    detecting, by at least one processor, an input, by the user, with respect to the display device;
    identifying, by at least one processor and based on the detected input, a gesture,
    determining, by at least one processor, whether the gesture corresponds to one of:
        a single-point gesture associated with a first area associated with the stack,
        a first gesture associated with a second area that includes an image of a person that is associated with one of the plurality of items,
        a multipoint gesture associated with the first area associated with the stack, or
        a second gesture associated with the second area,
            the second gesture being different from the first gesture; and
    selectively performing, by at least one processor, one of a first operation, a second operation, a third operation, or a fourth operation that are different,
        the first operation being performed when the gesture corresponds to the single-point gesture associated with the first area associated with the stack,
        the second operation being performed when the gesture corresponds to the first gesture associated with the second area,
        the second operation including:
            providing access to contact information associated with the image of the person,
        the third operation being performed when the gesture corresponds to the multipoint gesture associated with the first area associated with the stack, and
        the fourth operation being performed when the gesture corresponds to the second gesture associated with the second area,
        the fourth operation including:
            providing access to a group of messages associated with the image of the person, and
            providing another stack with another plurality of items based on a time-based ordering,
                the other plurality of items graphically representing the group of messages.

2. The method of claim 1, where the stack comprises a first stack, the other stack comprises a second stack, and the input comprises a first input, the method further comprising:
    detecting a second input; and
    providing content associated with the one of the first operation, the second operation, the third operation, or the fourth operation in third stack included in the GUI,
    the first stack being ordered based on a first criteria,
        the first criteria including the at least one of the alphabetical ordering or the user-specified ordering, and
    the third stack being ordered based on a second criteria that differs from the first criteria.

3. The method of claim 1, where the plurality of different content types includes at least one of:
    multimedia content,
    address book content,
    message log content, or
    weather content.

4. The method of claim 1, where the display device includes a touch screen, and
    where detecting the input includes:
        detecting a contact with the touch screen.

5. The method of claim 1, where selectively performing the first operation, the second operation, the third operation, or the fourth operation includes at least one of:
    selecting the stack,
    selecting one or more of the plurality of items,
    selecting content associated with the one or more of the plurality of items,
    accessing the content associated with the one or more of the plurality of items,
    adjusting the content associated with the one or more of the plurality of items,
    moving the stack from a first displayed portion of the display device to a second displayed portion of the display device,
    adding one or more additional items to the stack,
    removing the one or more of the plurality of items from the stack,
    viewing a plurality of available operations associated with the stack,
    selecting one of the plurality of available operations associated with the stack,
    manipulating an ordering of the plurality of items within the stack, or
    adjusting a displayed appearance of the plurality of items in the stack.

6. A user device comprising:
a memory to store a plurality of instructions; and
a processor to execute the plurality of instructions stored in the memory to:
cause a display to present a graphical user interface (GUI),
the GUI including a stack with a plurality of items that are partially exposed to permit selection,
the plurality of items being ordered in the stack based on at least one of:
an alphabetical ordering, or
a user-specified ordering,
the plurality of items being associated with a plurality of different content types, and
each of the plurality of items graphically indicating an associated one of the plurality of the different content types,
detect an input by a user of the user device,
identify, based on the detected input, a gesture,
determine whether the gesture corresponds to one of:
a single-point gesture associated with a displayed first area that is associated with the stack,
a first gesture associated with a displayed second area that includes an image of a person that is associated with one of the plurality of items,
a multipoint gesture associated with the displayed first area that is associated with the stack, or
a second gesture associated with the displayed second area,
the second gesture being different from the first gesture,
selectively perform one of a first operation, a second operation, a third operation, or a fourth operation that differ,
the processor performing the first operation when the gesture corresponds to the single-point gesture associated with the displayed first area associated with the stack,
the processor performing the second operation when the gesture corresponds to the first gesture associated with the displayed second area,
the processor, when performing the second operation, being to:
provide access to contact information associated with the image of the person,
the processor performing the third operation when the gesture corresponds to the multipoint gesture associated with the displayed first area associated with the stack, and
the processor performing the fourth operation when the gesture corresponds to the second gesture associated with the displayed second area,
the processor, when performing the fourth operation, being to:
provide access to a group of messages associated with the image of the person, and
provide another stack with another plurality of items based on a time-based ordering,
the other plurality of times graphically representing the group of messages.

7. The user device of claim 6, where the user device includes at least one of:
a computational device,
a communication device,
a navigational device, or
an entertainment device.

8. The user device of claim 6, where each of the plurality of items is associated with content that includes at least one of:
messages received by the user device,
weather content,
content associated with one or more contacts associated with the user,
music content,
one or more photos, or
one or more videos.

9. The user device of claim 6, where, when causing the display to present the GUI, the processor is to:
cause the display to present the plurality of items ordered according to a first granularity of time, and
where, when performing the fourth operation, the processor is to:
cause the display to present the other stack in which the other plurality of items are ordered according to a second granularity of time,
the first granularity of time being different from the second granularity of time.

10. The user device of claim 6, where the processor, when selectively performing the first operation, the second operation, the third operation, or the fourth operation, is to at least one of:
select the stack,
select one or more of the plurality of items,
select content associated with the one or more of the plurality of items,
access content associated with the one or more of the plurality of items,
adjust the content associated with the one or more of the plurality of items,
move the stack from a first portion of the display to a second displayed portion of the display,
add one or more additional items to the stack,
remove the one or more of the plurality of items from the stack,
view a plurality of available operations associated with the stack,
select one of the plurality of available operations associated with the stack,
manipulate an ordering of the plurality of items in the stack, or
adjust a displayed appearance of the plurality of items or the stack.

11. The user device of claim 6, where, when the processor is selectively performing the first operation, the second operation, the third operation, or the fourth operation, the processor is to:
provide, when the gesture corresponds to a multipoint gesture associated with the image of the person, access to an address book associated with the user.

12. The user device of claim 6, where, when causing the display to present the GUI, the processor is to:
cause the display to present the plurality of items in an order within the stack, the order being configurable by the user.

13. A non-transitory computer-readable medium storing instructions, the instructions comprising:
one or more instructions which, when executed by a user device, cause the user device to display a graphical user interface (GUI) on a display device,
the GUI including a stack,
the stack including a plurality of items that are partially exposed to permit selection,
the plurality of items being ordered in the stack based on at least one of:

an alphabetical ordering, or
a user-specified ordering,
the plurality of items being associated with a plurality of different content types, and
each of the plurality of items graphically indicating an associated one of the plurality of the different content types;
one or more instructions which, when executed by the user device, cause the user device to detect an input;
one or more instructions which, when executed by the user device, cause the user device to identify, based on the detected input, a gesture;
one or more instructions which, when executed by the user device, cause the user device to determine whether the gesture corresponds to one of:
a single-point gesture associated with a displayed first area that is associated with the stack,
a first gesture associated with a displayed second area that includes an image of a person that is associated with one of the plurality of items,
a multipoint gesture associated with the displayed first area that is associated with the stack, or
a second gesture associated with the displayed second area,
the second gesture being different from the first gesture; and
one or more instructions which, when executed by the user device, cause the user device to selectively perform one of a first operation, a second operation, a third operation, or a fourth operation that are different,
the first operation being performed when the gesture corresponds to the single-point gesture associated with the displayed first area associated with the stack,
the second operation being performed when the gesture corresponds to the first gesture associated with the displayed second area,
the one or more instructions to perform the second operation including:
one or more instructions to provide access to contact information associated with the image of the person,
the third operation being performed when the gesture corresponds to the multipoint gesture associated with the displayed first area associated with the stack, and
the fourth operation being performed when the gesture corresponds to the second gesture associated with the displayed second area,
the one or more instructions to perform the fourth operation including:
one or more instructions to provide access to a group of messages associated with the image of the person, and
one or more instructions to provide another stack with another plurality of items based on a time-based ordering,
the other plurality of items graphically representing the group of messages.

14. The non-transitory computer-readable medium of claim 13, where the plurality of items are associated with content that includes at least one of:
multimedia content,
address book content,
message log content, or
weather content.

15. The non-transitory computer-readable medium of claim 13, where the display device includes a touch screen, and
where the one or more instructions to detect the input include:
one or more instructions which, when executed by the user device, cause the user device to detect a contact with the touch screen.

16. The non-transitory computer-readable medium of claim 13, where the user device includes a wireless communication device.

17. The method of claim 4, where determining whether the gesture corresponds to the one of the single-point gesture associated with the first area associated with the stack, the first gesture associated with the second area, the multipoint gesture associated with the first area associated with the stack, or the second gesture associated with the second area includes:
determining whether the gesture corresponds to one or more of:
a single tap on the touch screen,
two or more taps on the touch screen,
a single stroke on the touch screen,
two or more strokes on the touch screen,
a single sliding motion on the touch screen, or
two or more sliding motions on the touch screen.

18. The user device of claim 6, where the display includes a touch screen, and
where the processor, when detecting the input, is to:
detect a contact with the touch screen.

* * * * *